United States Patent [19]

Sass

[11] 4,322,222
[45] * Mar. 30, 1982

[54] PROCESS FOR THE GASIFICATION OF CARBONACEOUS MATERIALS

[75] Inventor: Allan Sass, Los Angeles, Calif.

[73] Assignee: Occidental Petroleum Corporation, Los Angeles, Calif.

[ * ] Notice: The portion of the term of this patent subsequent to Oct. 21, 1997, has been disclaimed.

[21] Appl. No.: 183,777

[22] Filed: Sep. 3, 1980

Related U.S. Application Data

[63] Continuation-in-part of Ser. No. 630,557, Nov. 10, 1975, Pat. No. 4,229,185, which is a continuation-in-part of Ser. No. 292,883, Sep. 28, 1972, abandoned.

[51] Int. Cl.³ .............................................. C10J 3/46
[52] U.S. Cl. ................................. 48/197 R; 48/209; 48/210; 201/12; 201/31; 208/8 R
[58] Field of Search ................. 48/197 R, 209, 202, 48/206, 210, 201; 201/12, 28, 29, 31; 208/8 R

[56] References Cited

U.S. PATENT DOCUMENTS

| | | | |
|---|---|---|---|
| 2,560,403 | 7/1951 | Arveson | 48/202 |
| 2,608,526 | 8/1952 | Rex | 196/56 |
| 2,623,011 | 12/1952 | Wells | 48/197 R |
| 2,634,198 | 4/1953 | Kalbach | 48/197 |
| 2,657,124 | 10/1953 | Gaucher | 48/202 |
| 2,741,549 | 4/1956 | Russell | 48/206 |
| 2,750,330 | 6/1956 | Nelson | 202/14 |
| 3,039,955 | 6/1962 | Honnold | 208/132 |
| 3,298,928 | 1/1967 | Esterer | 201/6 |
| 3,574,065 | 4/1971 | Eddinger et al. | 201/31 |
| 3,593,968 | 7/1971 | Geddes | 48/102 R |
| 3,639,111 | 2/1972 | Brink et al. | 48/197 R |
| 3,698,882 | 10/1972 | Garrett et al. | 48/210 |
| 3,712,800 | 1/1973 | Schutte | 48/197 R |
| 3,736,233 | 5/1973 | Sass et al. | 48/210 |
| 3,746,522 | 7/1973 | Donath | 48/202 |
| 3,846,096 | 11/1974 | Mallan et al. | 48/202 |
| 3,985,519 | 10/1976 | Kalina et al. | 48/202 |
| 4,229,185 | 10/1980 | Sass | 48/197 R |

OTHER PUBLICATIONS

"Encyclopedia of Chemical Technology", Kirk-Othmer, vol. 10, pp. 356, 372-375 (1966).

Primary Examiner—Peter F. Kratz
Attorney, Agent, or Firm—Forrest E. Logan

[57] ABSTRACT

Carbonaceous material is gasified in a first pyrolysis zone substantially in an absence of free oxygen by heating with a solid heating media. The carbonaceous material is conducted through the first pyrolysis zone in turbulent flow to provide for the rapid transfer of heat to effect the gasification.

Gaseous products are recovered while char products are introduced into a second pyrolysis zone for additional gasification. The second pyrolysis zone is maintained substantially free of free oxygen. Gasification in the second pyrolysis zone is effected by the transfer of heat from a heating media to the char products produced in the first pyrolysis zone.

Gaseous products from the second pyrolysis zone are recovered.

The char products from the second pyrolysis zone can be heated to a temperature sufficient for use as a solid heating media.

The gaseous product from the first pyrolysis zone, after separation from the char product, can be cooled to a lower temperature to condense a liquid product therefrom.

Liquid products produced can be recycled to the pyrolysis zones to produce additional gaseous products. The gaseous product from the second pyrolysis zone can be used as a conveying gas for the carbonaceous feed, char products, and recycle char.

A portion of the char product and the gaseous product can be converted to methane for the production of pipeline gas.

32 Claims, 1 Drawing Figure

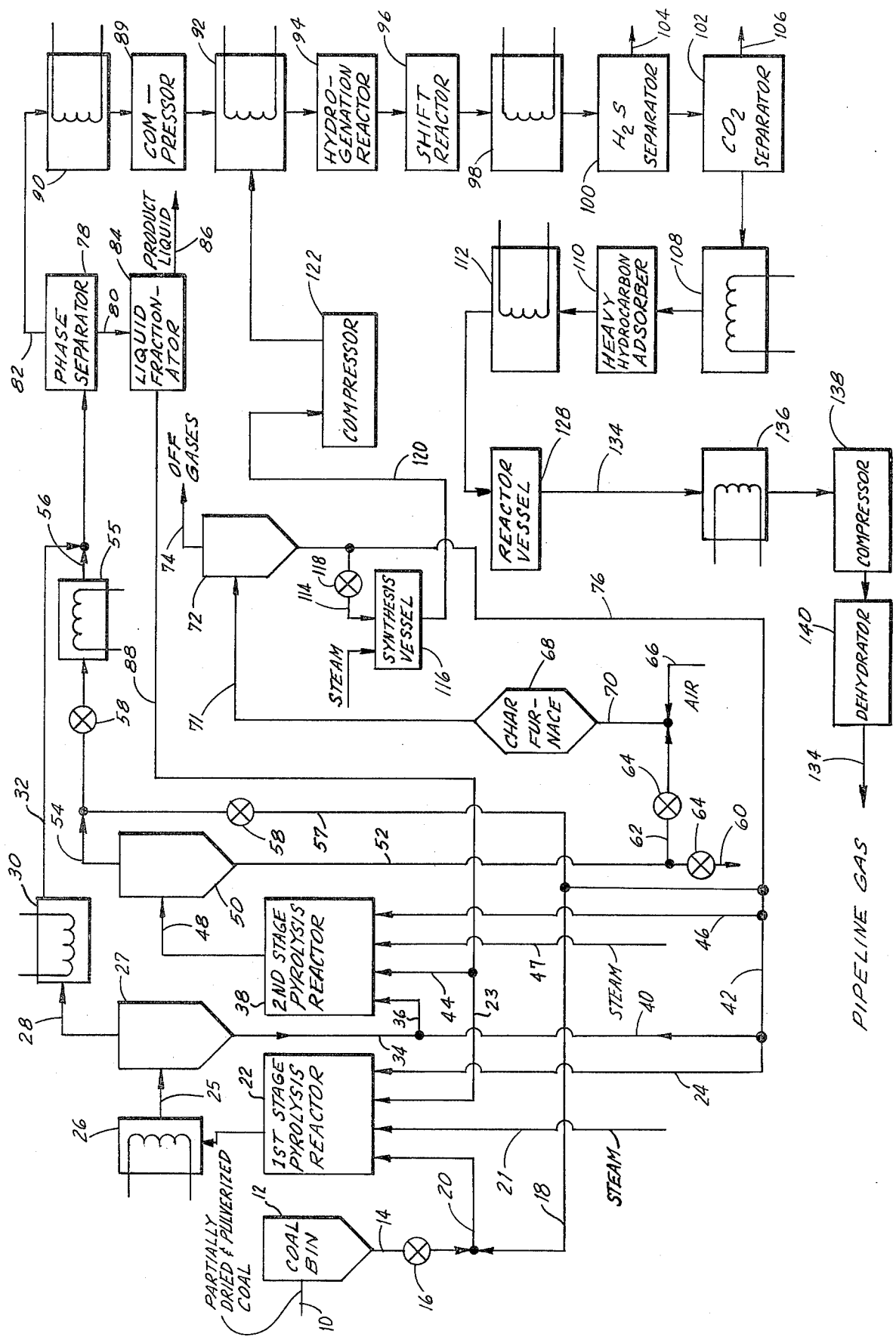

PROCESS FOR THE GASIFICATION OF CARBONACEOUS MATERIALS

This application is a continuation-in-part of my co-pending application Ser. No. 630,557, filed on Nov. 10, 1975, now U.S. Pat. No. 4,229,185, which was a continuation-in-part of my co-pending application Ser. No. 292,883, filed on Sept. 28, 1972, now abandoned.

BACKGROUND OF THE INVENTION

The present invention relates to a process of pyrolytically converting carbonaceous feed material into primarily gaseous products, and, more in particular, to pyrolytic conversion of such feed materials into primarily pipeline gas without producing excessive amounts of hydrogen.

Pipeline gas is a fuel gas which consists primarily of methane with some ethane and smaller amounts of higher molecular weight gases. These hydrocarbons have a heat content per unit volume which is much higher than the heat content per unit volume of hydrogen.

The following table illustrates differences in heat content on a unit volume basis:

| Gas | Heating Value (BTU/Ft$^3$) | BTU/Ft$^3$ of Contained Hydrogen |
|---|---|---|
| $CH_4$ | 1013 | 507 |
| $C_2H_6$ | 1792 | 597 |
| $C_2H_4$ | 1614 | 807 |
| $H_2$ | 325 | 325 |

With the heating value of hydrocarbons on a unit volume basis being higher than hydrogen, fuels rich in hydrocarbons can be transported through pipelines much more economically than hydrogen. Hydrogen is hazardous and hydrocarbons can be transported in pipelines more safely than hydrogen. In sum, hydrocarbon gases are much more preferable as a fuel than hydrogen.

The manufacture of pipeline gas from carbonaceous material such as coal is becoming increasingly attractive, especially in view of the fact that the ratio of natural gas reserves to production has been diminishing. Conversion of carbonaceous materials to pipeline gas is also attractive because of the tremendous waste disposal problems facing many areas.

Economies of converting carbonaceous materials such as coal into pipeline gas, however, have made conversion by standard techniques very unattractive and as a consequence very little, if any, pipeline gas from the gasification of carbonaceous materials is produced today on a commercial basis.

One of the problems in economic conversion of carbonaceous feed to pipeline gas is in the very unstable nature of the hydrocarbon product gases at high temperatures. For example, it is reported that the half life of ethane at 1500° F. is about 0.7 seconds. Some higher molecular weight hydrocarbons decompose even more rapidly.

SUMMARY OF THE INVENTION

The present invention provides an economical process for the gasification of carbonaceous material for the formation of gaseous products rich in hydrocarbons compared to hydrogen.

The present invention is characterized by the use of two or more pyrolytic reaction zones in which carbonaceous feed material is converted into gaseous products. In a first pyrolytic reaction zone, carbonaceous feed material preferably entrained in a conveying gas is subjected to pyrolytic conversion within a temperature range sufficient to convert at least a portion of the carbonaceous feed material to a gaseous product and for a residence time such that the gaseous product undergoes minimal thermal decomposition, to yield a gas rich in hydrocarbons. The residence time for the gaseous product in the first stage pyrolysis reaction zone is very short and the gaseous product is rapidly cooled to avoid substantial thermal decomposition of gaseous hydrocarbons to hydrogen and other products. A char solid product from the first stage pyrolytic reaction zone is separated from the hot gaseous product and introduced, preferably entrained in a conveying gas, into a second pyrolysis reaction zone. In the second pyrolysis reaction zone, the solid product is converted to a gas comprising carbon monoxide, hydrogen, a second char product and preferably some hydrocarbons. Preferably the second pyrolysis is conducted at a temperature higher than the temperature of the first pyrolysis reaction zone.

The product gas from the second pyrolsis comprising carbon monoxide and hydrogen can be used as recycle conveying gas for both stages, or both pyrolysis zones, of the reaction. Any excess product gas from the second stage pyrolysis may be combined with product gas from the first pyrolysis stage when the second stage product gas are previously sufficiently cooled to avoid cracking of the gas from the first stage. The solids from the second pyrolysis are separated from the hot non-condensed gaseous product from the second pyrolysis zone and are preferably used to generate the heat of pyrolysis for both of the pyrolysis reaction zones. This is done by introducing the solid from the second pyrolytic reaction zone into a furnace where it is heated, preferably by burning a portion of it, preferably with air, to raise the temperature of the whole. The hot solid is then used in the pyrolysis reaction zones to supply at least a substantial portion of the requisite heat of pyrolysis.

The preferred form of the present invention contemplates the recycling of product liquids from both pyrolysis reaction zones into both pyrolysis reaction zones until conversion of thermally convertible liquid product to gaseous product is substantially essentially complete. That is to say, the liquid products are recycled substantially to exhaustion. Those liquids, such as benzene, which are extremely stable and not easily subject to thermal decomposition in the pyrolytic reaction zones preferably are taken out of the system. To facilitate the recycling of product liquid for its conversion to gaseous products, a phase separator is employed to separate liquid and gaseous product from each other. The carbon monoxide and hydrogen produced in the first and second pyrolysis reaction are preferably converted to methane through known techniques of shift conversion and methanation. Char and steam can be used to generate hydrogen which can be used to convert such gases as ethane, propane and ethylene to methane which avoids problems with these heavier hydrocarbons associated with their high dew points. In the embodiment wherein the carbonaceous feed material is coal, there is substantially sufficient hydrogen produced by pyrolysis for their conversion.

It is also preferred to recycle that part of the product gas which is carbon monoxide and hydrogen for use as a solid conveying gas. Preferably, this recycled gas is used to entrain the feed material. The feed material is pulverized to present a large surface-to-volume ratio for its rapid heating. In the case of coal, the first stage pyrolysis reaction temperatures are maintained at a temperature sufficient to gasify the coal, but preferably below the ash softening temperature of the coal to prevent slagging. A temperature especially preferable is between about 1250° F. and about 1750° F. which is high enough to gasify a major portion of the gasifiable constituents of the coal but low enough in temperature that thermal decomposition of the lower hydrocarbon gases can be substantially minimized provided the residence time is maintained sufficiently short, as for example, less than about ten seconds.

To maximize the methane yield, a temperature range especially preferred is between about 1250° F. to about 1650° F. Within this temperature range, and for short residence times to minimize thermal decomposition of the lower hydrocarbon gases, preferably less than about ten seconds, a significant amount of hydrocarbon gases are generated. When these hydrocarbon gases are quickly cooled, after the pyrolysis reaction, for example, in less than about ten seconds, there will be little thermal decomposition or cracking of hydrocarbons into hydrogen and carbon.

In short, then, the carbonaceous feed material is subjected to conditions where pyrolysis is extremely rapid, employing small particle size, highly efficient heat transfer and rapid removal of hydrocarbon gaseous products from the pyrolysis zone.

In one embodiment of this invention, the first stage pyrolysis products are cooled immediately, for example less than ten seconds, after the first stage pyrolysis zone and before separation of the gaseous product from the char product to preserve a high yield of hydrocarbon-rich gases. In this embodiment, such cooling should not be to such an extent, for example below about 1000° F., that tars will condense out of the product gases onto the product solids and foul the solids-gases liquid separator. For highly efficient heat transfer, recycled hot char and feed material are in direct heat transfer relationship in the pyrolysis reaction zones. This heated char, as previously mentioned, preferably is produced from the second stage pyrolysis solids which are burned, preferably using air, to raise their temperature. Alternately, a portion of the solids from the first pyrolysis zone could be heated to a higher temperature for use as the solid heating media. This is not preferred because it can result in a loss of yield of gaseous product.

In another embodiment of this invention, wherein a carbonaceous feed material such as agglomerative coal or some bituminous coals is to be gasified, it is, in some instances, preferable to use a larger quantity of solid heating media in the first pyrolysis zone in order to reduce the tendency of the coal to agglomerate and plug the reactor. In this embodiment a portion of the product from the second pyrolysis zone, is recycled without additional heating to the first pyrolysis zone to supply the heat of pyrolysis. Thus, in this embodiment a larger quantity of heated char, that is lower temperature char having a temperature between about 1100° F. and about 1800° F., is used in the first pyrolysis zone then in the embodiment employing char heated to a temperature higher than the second pyrolysis zone temperature.

The present invention provides an efficient method for the gasification of carbonaceous materials, particularly coal. The gaseous products of the process have high heat value per unit volume, and thus the problems associated with most prior art processes of production of gas not rich in hydrocarbons are overcome, while at the same time offering lower capital and operating costs. The use of direct heat transfer from heated char, or other solid heating media, in both pyrolysis zone provides a simple, high productivity process which is capable of handling not only coking but non-coking coal, and carbonaceous waste material. The short residence time of the reaction products in the first stage pyrolysis at the limited temperature therein assures that thermal decomposition of the product hydrocarbons is low. By avoiding long residence times, then, pipeline gas high in hydrocarbon content can be formed. The higher temperature and/or residence time of the recent stage pyrolysis assures that there is maximum pyrolytic conversion of the solid feed and liquid feed to gaseous products.

The object of the present invention is to maximize the conversion of coal into hydrocarbons of from 1 to 4 carbon atoms and other gaseous products and chemical values used in the preparation of methane. This object is achieved in the present invention by first pyrolyzing the coal substantially in the absence of free oxygen at a predetermined temperature for a predetermined residence time so that preferably at least 20% by volume of the gaseous pyrolysis products are hydrocarbons of from 1 to 4 carbon atoms. During this stage, because of the relatively low pyrolysis temperature and short residence period, not all the pyrolyzable matter in the carbonaceous solids is pyrolyzed. The solids or char from the first pyrolysis stage which contain in part pyrolyzable matter is then pyrolyzed in a second pyrolysis zone in the substantial absence of free oxygen at a second predetermined temperature for a predetermined residence period so that the remaining pyrolyzable matter in the solids is substantially fully pyrolyzed to form a gaseous pyrolysis product comprising carbon monoxide and hydrogen and preferably additional hydrocarbons. The second stage pyrolysis temperature preferably is higher than the first pyrolysis temperature to insure complete pyrolysis of the solids. It is possible to pyrolyze the char product from the first pyrolysis zone at a temperature about the same as the temperature of the first pyrolysis zone by pyrolyzing for a relatively long period of time in the second pyrolysis zone.

The condensable pyrolysis products produced in both the first and second pyrolysis zones are preferably separated from the noncondensable gaseous pyrolysis products and solids and preferably recycled back into the first and second pyrolysis zones in order that the condensable products may be fully pyrolyzed to form gaseous pyrolysis products. The gaseous pyrolysis products from the two pyrolysis steps are preferably combined and treated to a shift reaction and methanation as described herein to obtain a gas rich in methane.

These and other features, aspects and advantages of the present invention will become more apparent from the following description, example, appended claims and drawing.

The advantages of two stage pyrolysis is that the carbonaceous material, or coal, is pyrolyzed in a first pyrolysis zone under conditions which minimize thermal decomposition of the gaseous pyrolysis products produced therein, and the separated solids from the first pyrolysis zone are further pyrolyzed to produce additional gaseous product the production of which if performed in the first pyrolysis zone would result in substantial thermal decomposition of the gaseous pyrolysis products which contains both condensable and noncondensable constituents. A solid heating media is employed in both pyrolysis zones to provide at least in part the thermal energy required for pyrolysis.

BRIEF DESCRIPTION OF THE FIGURE

The single FIGURE is a schematic line diagram illustrative of a preferred embodiment of the process of the present invention.

DETAILED DESCRIPTION OF THE PREFERRED EMBODIMENT

In general, a preferred process of the present invention contemplates two or more stages of pyrolytic conversion of carbonaceous feed material. The first stage of pyrolytic conversion occurs at a temperature sufficient to partially gasify the carbonaceous feed material, preferably at a temperature below the ash softening temperature of the carbonaceous feed material to prevent slagging from occurring in the pyrolysis reactor. Preferably, the temperature is not lower than about 1250° F. so that a major portion of the gasifiable material will be gasified. It is especially preferable that the temperature is no greater than about 1750° F. in order that thermal decomposition of the lower hydrocarbon gases be substantially minimized. Further, the residence time in the first pyrolysis zone is maintained sufficiently short to insure that thermal decomposition of the lower hydrocarbon gas is substantially minimized. To maximize methane yield, a preferred temperature range, is between about 1250° F. to about 1650° F. and the residence time is less than about ten seconds, preferably less than about three seconds, and most preferably in a range of about 0.01 to about 1 second to maximize recovery of lower hydrocarbons.

The pyrolysis temperature and residence time are adjusted to maximize the production of hydrocarbons of from 1 to 4 carbon atoms. A carbonaceous material rich in inherent hydrocarbon is preferred such as coal. In the preferred embodiment in which the carbonaceous feed material is coal, as shown in the FIGURE, the coal feed material preferably has been previously pulverized before it is fed into a first stage pyrolysis reactor. The coal is fed to the first pyrolysis zone preferably in a conveying gas which preferably comprises primarily hydrogen and carbon monoxide. Optionally, the coal may be dried before pyrolysis. Preferably, in the first stage pyrolysis reactor, recycled condensable pyrolysis products, that is liquid product, is also cracked to produce more product gas. The heat required for the pyrolysis in the first stage reactor is supplied in whole or in part by hot char which is a product of this process. Preferably, after pyrolysis, the solid and gaseous reaction products are cooled to a temperature between about 1000° F. and about 1400° F. within about 0.01 seconds to about three seconds after exiting from the first pyrolysis reactor and before separation from the solids. This rapid cooling step minimizes thermal decomposition of the lower hydrocarbon gases of from one to four carbon atoms. In this embodiment, the lower temperature should not be so low as to cause condensation of the gaseous product. In an especially preferred embodiment, the products are cooled to about 1000° F. which would minimize thermal decomposition to an even greater extent than cooling to 1400° F.

After the pyrolysis and the cooling step, if employed, the solid product is separated in a phase separator, such as a cyclone, from the gaseous products and introduced into a second stage pyrolysis reactor while the gaseous products are rapidly cooled to a still lower temperature of about 350° F. or less to condense out liquid products and avoid additional but slower thermal decomposition.

The second stage pyrolysis reaction takes place preferably at a temperature below the ash softening temperature of the carbonaceous feed material, preferably at a higher temperature than the first stage, and especially preferably from about 1400° F. to about 1800° F. or higher. The higher temperature, of course, produces a high rate of conversion. The purpose of the second stage pyrolysis is to substantially volatilize the remaining volatilizable matter in the solid product from the first stage pyrolysis and preferably convert it to hydrogen and carbon monoxide, and gaseous hydrocarbons.

The first stage pyrolysis solid product, hot char, and preferably a portion of the condensable product, are introduced into the second stage pyrolysis reactor. The hot char provides all or part of the heat energy required in the pyrolysis. Products from the second stage reactor are separated into gaseous and solid constituents. The gaseous constituent, primarily hydrogen and carbon monoxide but with some condensable compounds, preferably can be used as the conveying gas in both pyrolytic reactors. Preferably, gaseous products of the second stage pyrolysis which are not used as a conveying gas, and which can contain a condensable constituent, are cooled and are combined with the liquid and gaseous products of the first stage pyrolysis for subsequent processing. A portion of the solids from the second stage pyrolysis reactor can be burned, preferably with air, in a furnace to generate the hot char which can be used to supply the heat energy for both stages of pyrolytic conversion. Alternatively, the char can be heated by an electrical or gas furnace or by heat exchanger means. The hot char can also be used to generate hydrogen and carbon monoxide by reaction with steam and the gaseous products produced thereby used in a methanation reaction to produce additional methane. The balance of the char from the second stage pyrolysis reactor can be used as a product solid.

The merged liquid and gaseous products of both stages of pyrolytic conversion are separated in a phase separator into separate liquid and gaseous products. In a preferred embodiment, the liquid products can be recycled to either or both pyrolysis zones to accomplish substantially complete conversion thereof to gas; preferably the thermally stable liquid products such as benzene are recovered from the liquid products. This separation may be accomplished in a fractionator. Preferably, the gaseous products from the phase separator can be further processed to produce the desired pipeline gas. This further processing includes hydrogenation of unsaturated hydrocarbons, a shift conversion to generate hydrogen for reaction with carbon monoxide for methanation, impurity removal, and methanation.

Referring to the FIGURE, pulverized coal, which is meant to include all the various types of coal or coal like substances as anthracite coal, bituminous coal, subbituminous coal, lignite and peat, is introduced as stream 10 into a coal bin 12. It is to be understood that other forms of carbonaceous material such as municipal waste or garbage, or industrial waste such as tree bark, scrap rubber, rubber tires, sugar, refinery waste, saw dust, corn cobs, rice hulls, animal matter from slaughter houses, used or waste petroleum products and other carbon-hydrogen containing materials can also be converted by this process.

In the embodiment wherein the carbonaceous feed material is coal, the coal can optionally be fully dried or partially dried to leave some moisture in it for the generation of steam. The generated steam can be used to react with the coal to produce carbon monoxide and hydrogen which are later reformed and methanated. The coal is preferably partially dried to avoid the expenditure of heat energy for heating and vaporizing water in the pyrolysis zone. The coal is pulverized to present a large surface to volume ratio to obtain rapid heating of the coal in the pyrolysis reaction. Preferably, the coal is at least 80° minus (−) 60 mesh (Tyler standard mesh), especially preferably at least 80% −100 mesh with the remainder passing −60 mesh, and most especially preferably about −200 mesh or smaller.

Particulate coal is drawn from coal bin 12 in a stream 14, as by gravity. The rate of coal flow in stream 14 is controlled by a valve 16 in the stream. A rotary or a star valve would satisfy the sealing requirements of the valve.

The process can be performed at any pressures, however, gaseous product quality is enhanced at higher pressures, about 2000 psig or higher, when the gas in the pyrolysis zone contains hydrogen. The pressure at which both pyrolysis reactions takes place is preferably from about zero psig to about 2000 psig or higher. The upper pressure limit is limited only by material limitations and complexity of the process equipment. At pressures about 100 psig it is believed that the equipment will become progressively more expensive. Consequently, valve 16 must act as a pressure seal between its upstream and downstream sides. The coal in stream 14 is substantially free of free oxygen. This can be accomplished by purging the coal in bin 12 with nitrogen, carbon dioxide or recycle gas. A stream 18 directs a carrier gas of recycled gas, largely carbon monoxide and hydrogen, from the second stage of pyrolytic conversion which is described below. The recycle carrying gas and particulate coal feed meet as a stream 20 for introduction together into a first stage pyrolysis reactor 22. Within the reactor, the entrained stream of carrier gas hot char and feed coal is highly turbulent for good mixing and heat transfer. The stream in the reactor 22 must be turbulent to insure good heat transfer characteristics to the coal feed. The Reynolds flow index number of the stream is always greater than 2,000, preferably greater than 2,500, to insure adequate turbulence. The velocity of the entrained stream is relatively high to effect rapid transport of pyrolysis products through the first stage pyrolysis reactor. The feed to the pyrolysis reactor includes recycle liquid through a stream 23 and hot recycle char from a stream 24, the latter preferably being entrained in a carrier gas of recycle gas. The recycle liquid can be injected into the pyrolysis reactor with injection means, such as nozzles. It is preferable to introduce the liquid as a mist into the pyrolysis zone for effective heat transfer to the liquid and its subsequent cracking. The liquid is captured by the carrier gas stream within the reactor. Therefore, the residence time of the liquid in the reactor is also very short, for example less than ten seconds, preferably less than three seconds, and especially preferably between about 0.1 and about 1 second. The heat required for the pyrolysis in the first stage pyrolysis reactor is preferably supplied by hot char from stream 24, as previously stated. This hot char is also particulate and therefore will be highly turbulent in pyrolysis reactor 22 so that heat transfer will be very efficient between the char, coal and the recycle liquid.

In one embodiment, a stream 21 of steam can be introduced into the first reactor 22 together with the coal feed, carrier gas, recycle liquid and char. The steam injection appears to have slight effect on the amount of hydrocarbons produced in the first reactor 22. However, the steam injection does increase the amount of fuel gas produced as calculated in methane equivalents, by as much as 45%. Methane equivalents refers to the amount of methane that can be produced from a given gas composition. For example, a gas containing carbon monoxide and hydrogen as well as methane can be converted into a methane rich gas described below by methanation. The steam can be injected at any temperature above 212° F. Steam injected at temperatures below the pyrolysis temperature in the first reactor 22 will consume heat energy therein, and, as a consequence, the amount and/or temperature of the hot char will have to be increased to maintain the pyrolysis temperature within the range of about 1250° F. to about 1750° F. Steam injected at temperatures above the pyrolysis temperature in the reactor 22 will give off heat energy. However, since the reaction between steam and coal is endothermic the amount and/or temperature of the char will still have to be increased to maintain the pyrolysis temperature within the first reactor 22. Steam can be injected in a weight amount up to about 50% of the weight of coal feed in the reactor 22, preferably less than about 25% of the coal feed weight.

The weight ratio of the solids (char and coal) to the carrier gas is preferably from about 3:1 to about 600:1, and especially preferably from about 50:1 to about 100:1. The weight ratio of char to coal is from about 1:1 to 20:1 and is dependent upon the heat capacities of the char and coal, the char temperature and desired pyrolysis temperature.

The temperature within pyrolysis reactor 22 is maintained at a temperature sufficient to gasify the carbonaceous feed material, preferably between about 1250° F. and about 1750° F., and especially preferably from about 1250° F. to about 1650° F. This temperature range is chosen because the gaseous hydrocarbons generated during pyrolysis decompose very rapidly at high temperatures even with short exposure to high temperatures. In short, the rate of decomposition is extremely temperature dependent. Specifically, the rate of thermal decomposition of the gaseous products of coal pyrolysis, viz ethylene, methane and ethane, is extremely rapid. At higher temperatures, even with a short residence time, sufficient thermal decomposition takes place to significantly and adversely affect the ultimate hydrocarbon gaseous yield.

With the desired temperature range of pyrolysis in the first stage reactor, the residence time of material in the first stage reactor is maintained sufficiently short that thermal decomposition of the lower hydrocarbon gases of one through four carbon atoms is minimized within the first pyrolysis zone. For example, a residence time is less than ten seconds, preferably less than three seconds, and especially preferably between about 0.1 to about 1 second. Thermal decomposition of the pyrolysis products is also a strong and direct function of time at pyrolysis temperatures. The lower the residence time within the reactor consonant with particulate coal conversion, the higher the yield of hydrocarbon-rich product gas.

The first stage product leaving pyrolytic reactor 22 does so as a stream 25 which contains gaseous and solid pyrolysis products. The gaseous product contains principally hydrogen, carbon monoxide, carbon dioxide and gaseous hydrocarbon of from 1 to 4 carbon atoms and higher. Preferably, at least 20% by volume of the gaseous products will be gaseous hydrocarbons, especially preferably at least about 30%. This stream passes through a heat exchanger 26 to a separator 27 to separate the solid products from the gaseous products; the separator 27 may be in the form of a cyclone separator.

In another embodiment (not shown in the figure), heat exchanger 26 may be after separator 27 or eliminated if the gaseous product is cooled sufficiently rapidly in heat exchanger 30 to minimize thermal decomposition of the hydrocarbons of from 1 to 4 carbon atoms.

Returning to the embodiment shown in the Figure, heat exchange within heat exchanger 26 can be by water injection, gas injection or by the addition of solids. The important thing is to rapidly cool, within less than about 10 seconds, as by quenching, the products of the first stage of pyrolysis before any material amount of thermal decomposition takes place. Preferably, the products are cooled to a temperature between about 1000° F. and about 1400° F. Especially preferably, the products are cooled to a temperature of about 1000° F. Cooling first stage pyrolysis product stream 25 much below 1000° F. is generally not desirable because tars in the pyrolysis vapor usually will condense at temperatures below 1000° F. which could foul separator 27. However, if tar condensation is no problem, the product can be cooled to temperatures below about 1000° F.

In the preferred embodiment, gaseous product from separator 27, preferably a cyclone, exits as a stream 28 from the separator and enters into a cooling heat exchanger 30 where the gaseous product is further cooled, preferably within about 60 seconds, to a temperature of about 350° F. or less, or preferably to a temperature of about 100° F. or less, to avoid additional but slower thermal decomposition of the gaseous hydrocarbons. Condensable products also condense from the gaseous products and are entrained in the gaseous stream as liquid product. Cool liquid and gaseous products leave heat exchanger 30 as a stream 32.

Solid product from separator 27 leaves the separator through a stream 34 for introduction, preferably with a carrier gas, through a stream 36 into a second stage, pneumatic transport, pyrolysis reactor 38. The carrier gas emanates from a branch stream 40 off of a stream 42. Hot char is also in stream 40. The carrier gas and hot char come from downstream of the second stage pyrolysis reactor. Stream 42 also supplies carrier gas to branch stream 24 to the first stage pyrolytic reactor.

Preferably, the second stage pyrolysis reactor also has a feed recycle liquid which enters the reactor through a stream 44. Stream 44 is a branch from stream 88. A turbulent stream of hot char in a carrier gas enters the second stage pyrolytic reactor through a stream 46, which emanates from stream 42 as well as from stream 40. In one embodiment, a stream 47 of steam can be injected into the second reactor. The steam can be injected at any temperature above 212° F. As with case of steam injection in the first reactor 22, the temperature and/or amount of char will have to be adjusted to compensate for the steam to maintain the pyrolysis temperature in the second reactor 38. Steam can be injected into the second reactor 38 in weight amounts up to about 50% of the weight of the solid product or char feed in the second reactor. The same intimate mixing of materials undergoing pyrolysis and misting of liquid which are accomplished in the first stage of pyrolysis are also accomplished in the second stage to promote efficient pyrolysis. The second pyrolysis zone is maintained substantially free of free oxygen. The carrier gas is substantially free of free oxygen and can be almost any gas that will not deleteriously attack the feed material or the pyrolysis products. Carrier gases that can be used in the present process include hydrogen, carbon monoxide, carbon dioxide, nitrogen, steam recycle gas and mixtures thereof. Preferably, the carrier gas is recycled gaseous product from the second pyrolysis which contains principally hydrogen and carbon monoxide. With a coal feed stock an analysis (volume percent) of the product gas from the second pyrolysis zone can be the following: hydrogen 40–75%, carbon monoxide 10–40%, methane 10–20% with lesser amounts of other hydrocarbons, nitrogen, carbon dioxide and the like.

In the second pyrolysis, the solid (solid product and char) to carrier gas weight ratio is between about 3:1 and about 600:1, or higher ratios preferably between about 50:1 and about 100:1. The char to solid product ratio is from about 1:1 to about 20:1. The ratio will be determined by the heat capacities of the char and solid product, the char temperature and the desired pyrolysis temperature.

In the embodiment wherein coal is the feedstock, the gaseous reaction products of the second stage pyrolysis reactor are primarily carbon monoxide and hydrogen and preferably hydrocarbons. The yields of these gases are further increased when steam is injected into the second reactor 38. The steam apparently reacts with the carbon in the char to produce hydrogen and carbon monoxide. There is conversion of recycle liquid into lighter, more thermally stable values and gaseous product. The temperature of pyrolytic conversion in the second stage reactor is limited by materials of construction and therefore is preferably from about 1400° F. to about 1800° F. or higher and preferably higher than the first pyrolysis zone. This temperature range is chosen so that pyrolysis is rapid and that the remaining pyrolyzable matter is substantially pyrolyzed. As temperatures are increased problems associated with unnecessary char consumption, agglomeration and/or slagging of char, and higher expenditure of heat energy became more serious. The pyrolysis temperature and residence time of the second pyrolysis step are adjusted so that substantially all pyrolyzable matter is pyrolyzed and a gaseous pyrolysis product containing preferably at least 80%, and especially preferably 90% by volume carbon monoxide, hydrogen, and hydrocarbon gases is obtained.

The second stage pyrolysis reactor complements the first stage pyrolysis reactor in generating components of the pipeline gas, for significant amounts of the hydrogen and carbon monoxide generated here are converted in a shift converter and methanator to methane.

The process can be performed at any pressure, however, gaseous product quality is enhanced at high pressures, about 2000 psig or higher, when the gas in the pyrolysis zone contains hydrogen. The pressure at which both pyrolysis reactions takes place is preferably from about 0.0 psig to about 2000 psig or higher. The upper pressure limit is limited only by material limitations and complexity of the process equipment. At pressures above 100 psig, it is believed that the process equipment will become progressively more expensive.

The gaseous and solid products leaving the second stage reactor 38 do so through a stream 48 and enter a solid separator 50 where solids are taken off as a stream 52 and a gaseous products are taken off as a stream 54. Preferably, the separator is of the cyclone type. Preferably, some of the gaseous products of stream 54 pass into a heat exchanger 55 where they are cooled to condense out condensable products and preferably for merger with the gaseous and liquid products of the first stage of pyrolysis at a sufficiently low temperature to prevent thermal decomposition of the first stage gaseous products. The cooled products leaving heat exchanger 55 do so as a stream 56 which joins stream 32. A recycle gas stream 57, preferably primarily of hydrogen and carbon monoxide but which can have some condensable products, is used in this embodiment as the transporter of solids and liquids through pyrolysis reactors 22 and 38. Gas from the second stage of pyrolysis not needed for transport is passed through heat exchanger 55 and combined with first stage gaseous and liquid products. The amount of gas proportioned between streams 57 and 56 is controlled by valves 58.

Recycle gas stream 57 supplies streams 42 and 18. As described above, stream 18 transports coal from stream 14 and stream 42 transports hot char to both pyrolysis stages. Stream 42, through its branch 40, provides the transport for solid product from separator 27 through stream 36 into reactor 38. It should be appreciated that stream 57 is very hot, essentially at the temperature of pyrolysis in the second stage reactor, and that heat energy is preferably conserved in the recycle gas stream.

The solids leaving separator 50 through stream 52 are divided into product char and recycle char as streams 60 and 62, respectively. The product char can have some of its heat reclaimed by conventional heat exchanger devices (not shown). The product char has many uses. For example, the product char can be used as a power plant fuel, it can be used as a raw material for synthetic coke, for metallurgical application or for activated carbon and it can be used as a raw material for synthetic fuel gas production as described below. The percentage of recycle char and product char can be controlled by the openings of valves 64. In any event, recycle char through stream 62 and preferably air through a stream 66 are mixed together and enter a char furnace 68 as a stream 70. Within the char furnace, controlled burning of some of the char takes place. Controlled combustion is effected by limiting the amount of air or free oxygen containing gas admitted to the char furnace to insure an oxygen lean atmosphere, leaner than stoichiometric. The high temperature char and products of combustion leave the char furnace as a stream 71. The products of the char furnace are separated in a separator 72, preferably a cyclone type of separator. Off gases leave the separator through a stream 74, and high temperature char leaves the separator through a stream 76 for introduction into gases of recycle stream 57 and the forming of streams 42, 46, 40 and 24. Preferably, the high temperature char has sufficient heat energy to supply the necessary heat for pyrolysis in both reactors. Preferably, the high temperature char is heated to a temperature below the ash softening temperature of the coal.

Again it is significant to point out that in this embodiment, the char from char furnace 68 which is used as the source of heat in pyrolysis reactors 22 and 38 is a product of particulate coal from coal bin 12 and as such is very small in particle size. The small particle size insures effective an efficient direct heat transfer to the coal feed in the pyrolysis reactors.

A portion of the hot char leaving separator 72 as a stream 76 is diverted as a branch stream 114 into a synthesis vessel 116. The amount of diverted char is controlled by a valve 118. Very hot steam is also introduced into the synthesis vessel 116. Within the synthesis vessel, the char is heated to a temperature preferably within the range of about 1500° F. to about 2500° F., preferably by reacting with oxygen, and contacted with the steam at pressures ranging from about 300 to about 600 psig to produce a synthesis gas stream 120. In another embodiment, solids from either pyrolysis zones can be contacted with steam to produce hydrogen and carbon monoxide. The synthesis gas stream is essentially carbon monoxide, carbon dioxide and hydrogen. The synthesis gas stream is fed into a gas compressor 122 and then passed into the heat exchanger 92. The synthesis gas stream is then treated with a gas stream 82 as described below.

An alternate embodiment (not shown in the Figure) of the invention is to entrain the solids from separator 27 into a stream of carrier gas which does not contain hot char from the char furnace 76. In this embodiment, the hot char from the char furnace enters the second pyrolysis reactor 38 solely through stream 46.

Still another alternate embodiment (not shown in the Figure) is to introduce all or part of the solids into either or both pyrolysis reactors by means other than by entraining in a carrier gas, for example such as by gravity feed or with a screw type feeder. Such solid streams which can be introduced into the pyrolysis zone by means other than by a carrier gas are, for example, the coal stream, the solids from the first pyrolysis reactor, and the heating media.

Returning to what happens to the gaseous and liquid products of pyrolysis from both pyrolysis zones, gaseous and liquid products, from stream 56 and stream 32, recycle liquid enters a phase separator 78 from which the liquid values are taken off as a stream 80 and the gaseous values are taken off as the stream 82. The liquid values enter a liquid fractionator 84 wherein thermally stable products such as benzene are separated from thermally unstable products and are taken off as product liquid stream 86. The thermally unstable liquid products are taken off from the fractionator 84 as a stream 88 for recycling. Stream 88 feeds branch streams 23 and 44 to first stage pyrolysis reactor 22 and second stage pyrolysis reactor 38, respectively, with liquid values.

After the liquid product has been separated from the gas, the gaseous products of pyrolysis are further processed. For the most part, the pressure at which further processing is carried out is preferably from about 50 psi to about 150 psig. Where pressure is expressed in psi units it is understood to mean gage pressure (i.e. psig). The pressure of the gases of stream 82 may, therefore, have to be raised and for this purpose a compressor 89 is used. If pressurization is required, stream 82 is preferably cooled to a temperature from about 80° F. to about 120° F. prior to pressurization to avoid compressor damage. Stream 82 leaving compressor 89 is brought to an elevated temperature, preferably from about 600° F. to about 950° F., in a heat exchanger 92 and compressed to an elevated pressure, preferably from about 50 psig to

DETAILED WORKING EXAMPLE

A bituminous coal is partially dried and pulverized into solid particles. The particles are sized so that they pass through a 200 mesh sieve (U.S. Bureau of Standards, Standard Screen Series 1919). The coal's analysis is as follows:

| Component | Weight, % |
|---|---|
| C | 73.60 |
| H | 4.85 |
| O | 7.22 |
| N | 1.60 |
| S | 1.10 |
| Ash | 11.63 |

The partially dried and pulverized coal is then fed into pyrolysis reactor 22 which is operated at a pressure of about 15 psia. Hot, recycle char is also introduced into the reactor. The temperature of the char is 1700° F. and the ratio of particulate char feed rate to particulate coal feed rate is adjusted so that the system temperature at the exit of the reactor is 1450° F.

The solids are blown through the pyrolysis reactor at high velocity using recycle product gas.

The residence time in the reactor is about 0.1 second. The reaction products pass through a cyclone to recover the solids. The gases are then cooled rapidly to a temperature of about 100° F. A quantity of liquid is also recovered in this operation. The yields obtained are as follows:

| Product Distribution, weight percent | |
|---|---|
| Gas | 27.2 |
| Liquids | 10.3 |
| Char | 62.0 |
| Water | 0.5 |

| Gas Composition % Vol. ($H_2S$ and $NH_3$ free) | |
|---|---|
| $H_2$ | 21.4 |
| $CH_4$ | 23.2 |
| $C_2H_6$ | 5.1 |
| $C_2H_4$ | 14.3 |
| CO | 21.1 |
| $CO_2$ | 6.4 |
| $C_3^+$ | 8.5 |

The char and liquid are then fed to pyrolysis reactor 38 where they are heated with additional recycle char to a temperature of 1600° F. In this latter reactor, the residence time is 1.0 second. The yields obtained are as follows:

| Product Distribution, weight percent | |
|---|---|
| Gas | 13.1 |
| Liquid | 4.2 |
| Char | 82.7 |

| Gas Composition, % Vol. ($H_2S$ and $NH_3$ free) | |
|---|---|
| $H_2$ | 73.5 |
| CO | 26.5 |

The present invention contemplates the pyrolyzation of carbonaceous feed material to form gaseous pyrolysis products rich in hydrocarbons and relatively poor in hydrogen for evolving pipeline gas. Because of the very simple reactions and highly efficient heat transfer methods employed, the pyrolysis reactions are economical and do not require elaborate reactors or attendant equipment. The carbonaceous feed material provides the energy for the pyrolytic conversion of the feed by selective combustion of a portion of the char in the char furnace. The char can also provide the heat energy required to provid the requisite temperature in the synthesis vessel wherein char and steam are reacted to produce a synthesis gas stream of carbon monoixide, carbon dioxide and hydrogen. Effective use is made of the shift reaction between carbon monoxide and water to generate carbon dioxide and hydrogen, which hydrogen is used to augment hydrogen from the second stage pyrolytic conversion to react with carbon monoxide to generate methane. Additional hydrogen is generated in the synthesis vessel and in a second shift reaction. This additional hydrogen is also used to generate methane by the well known reaction with carbon monoxide. Hydrogen reacts with heavier molecular constituents of the gaseous product of pyrolysis to convert these constituents to methane. In sum, the process is economical with relatively small capital plant expense and operating cost. As an example of the effectiveness of the present invention, because of the high yield of hydrocarbons in the pipeline gas, it is constructive to consider the production of gas from a coal with a heating value of 12,000 BTU's per pound containing 5% hydrogen. Assuming that all the hydrogen is extracted from this coal by pyrolysis as molecular hydrogen, the gas yield would be about 18,900 cubic feet per ton of coal with about 15.6% of the energy in initial coal being recovered in the gas. This energy yield is contrasted with a case where the hydrogen in the coal is extracted as ethylene. The gas yield would only be 9,450 cubic feet per ton of coal, but the energy recovered as gas is 63.5% of that contained in the original coal. The gas from the first pyrolysis stage, produced without feeding steam to the first pyrolysis stage, normally has the following composition for the bituminous coal feed described in this example:

| | Percent by volume |
|---|---|
| $H_2$ | 10-50 |
| CO | 20-40 |
| $CO_2$ | 2-40 |
| $CH_4$ | 10-25 |
| $C_2H_6$ | 0-10 |
| $C_2H_4$ | 0-15 |
| $C_2H_2$ | 0-2 |
| $C_3H_8$ | 0-2 |
| $C_3H_6$ | 0-6 |
| $C_3H_4$ | 0-2 |
| $C_4'S$ | 0-1 |
| Benzene | 0-1 |
| Toluene | 0-1 |

The present invention has been described with reference to a certain preferred embodiment employing coal feed. The spirit and scope of the appended claims should not, however, necessarily be limited to the foregoing detailed description.

What is claimed is:

1. A process for the gasification of particulate carbonaceous material comprising:

about 150 psig, by a compressor (not shown) and feed into a hydrogenation reactor 94.

The gases passed into hydrogenation reactor 94 are contacted with a hydrogenation catalyst such as cobalt molybdate catalyst, to substantially hydrogenate the unsaturated hydrocarbons of from one to four carbon atoms, such as propylene, ethylene and butylene to their respective saturated forms of propane, ethane and butane. The amount of hydrogen generated in pyrolysis of coal and entering hydrogenation reactor 94 in stream 82 is substantially sufficient for this hydrogenation. That is in this embodiment wherein the carbonaceous feed material is coal, sufficient hydrogen is produced by the process without feeding steam to either or both pyrolysis reactors to substantially saturate all the unsaturated hydrocarbons of from one to four carbon atoms. There is also in this embodiment sufficient hydrogen produced without the use of steam to convert the hydrocarbons of from one to four carbon atoms to methane. Such conversion to methane can be accomplished in a subsequent step.

After hydrogenation, the gases of stream 82 enter a shift reactor 96 which also operates at elevated temperatures and pressures preferably from about 600° F. to about 950° F. and from about 50 psig to 150 psig. The shift conversion is well known and is given by the following formula:

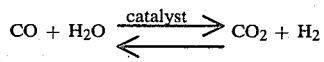

A conventional shift catalyst such as chromium-promoted iron oxide can be used in this step.

After the shift conversion reaction, the gases of stream 82 are cooled, preferably to a temperature of from about 200° F. to about 300° F. for impurity removal. Preferably, the pressure of the stream remains elevated. Cooling is effected in a heat exchanger 98. $H_2S$ and $CO_2$ are substantially removed from stream 82 in conventional separators 100 and 102, respectively, and taken from the system as streams 104 and 106, respectively.

After substantial removal of hydrogen sulfide and carbon dioxide, stream 82 is further cooled in a heat exchanger 108, preferably to a temperature from about 80° F. to about 120° F. The stream, thus cooled, is introduced into heavy hydrocarbon adsorber 110 for the removal of hydrocarbon products of 5 more carbon atoms. Activated carbon or similar adsorbent can be used for removal of the heavy hydrocarbons. After substantial removal of the $C_5$ and higher hydrocarbons from stream 82, the stream is passed through a heat exchanger 112 where the stream is heated to an elevated temperature, preferably from about 500° F. to about 900° F., and then passed to a reaction vessel 128. The stream pressure through this last heat exchange is still, preferably, from about 50 psig to about 150 psig.

A methanation reactor takes place in reactor vessel 128 to convert hydrogen and carbon monoxide to methane and steam. A nickel catalyst, such as Raney nickel, is used in the methanation reaction and the reaction takes place at a temperature from about 500° F. to about 900° F. and at a pressure of from about 50 psig to about 150 psig.

The products of the reactions in reactor vessel 128, largely methane, and other values passing through the vessel leave it as a stream 134. Stream 134 is cooled, preferably to a temperature of from about 80° F. to about 120° F. in a heat exchanger 136 and is then compressed in a compressor 138 to pipeline pressure, preferably from about 900 psig to about 1100 psig. After compression, water is removed from stream 134 in a dehydrator 140. Stream 134 leaving dehydrator 140 is pipeline gas.

A typical pipeline gas has a heating value of about 1000 Btu/SCF and specific gravity of about 0.58. The composition by volume of a pipeline gas can be methane 95%, ethane 3.7% and nitrogen 1.3% with lesser amounts of higher hydrocarbons, water, carbon dioxide, carbon monoxide, hydrogen and the like.

The system illustrated with reference to the Figure is of course merely schematic. Such incidentals to the system as pumps, blowers, vents and the like are not shown for simplicity inasmuch as their use is well within the province of those skilled in the art.

The carbonaceous feed materials which can be employed in the process include coal, such as anthracite coal, bituminous coal, subbituminous coal, lignite and peat, preferably bituminous or subbituminous coal; municipal waste or garbage, and industrial waste such as tree bark, scrap rubber, rubber tires, sugar refinery waste, saw dust, corn cobs, rice hulls, animal matter from slaughter houses, used or waste petroleum products and other carbon-hydrogen containing materials.

In an embodiment using coal as a feed material, the feed material should be relatively small, for example about 200 mesh or smaller is most especially preferred to effect rapid heat transfer in the pyrolysis reactors with optimum pyrolytic conversion of the feed material to the desired products. It is to be understood that particle sizes of about 200 mesh or smaller are not required for all materials but merely most especially preferred for many materials such as coal.

The feed material described in this detailed description is coal. The process of the present invention, however, is viable with a variety of carbonaceous materials including agglomerative bituminous coal, which has heretofore been difficult to gasify as well as municipal and industrial wastes.

The pipeline gas of the embodiment described in detail invention is interchangeable with natural gas and they can be used in the present utility gas distribution systems. The gas can be pumped at pressures of 1000 psig or greater. It has a heating value of about 900 to about 1100 Btu per standard cu. ft. (SCF). The gas consists principally of methane (preferably 80% by volume or more) and smaller amounts of $C_2$'s, $C_3$'s, $C_4$'s, $C_5$'s, $C_6$'s, alkanes, alkenes, and alkynes. The pipeline gas can contain from about 0 to about 25% by volume of hydrogen, preferably less than 5% hydrogen. For a pipeline gas, the gas preferably has no more than 0.1% by volume of carbon monoxide and no more than 0.1% by volume sulfur compounds such as hydrogen sulfide and sulfur dioxide. The gas can contain up to 5% by volume of inert gases such as helium, nitrogen, argon and carbon dioxide. However, the gas preferably contains no more than 3% by volume carbon dioxide. The gas can be dried by conventional means to maintain a moisture content with acceptable standards, as for example 7 lb per million SCF. Preferably, the specific gravity of the gas is between about 0.5 and about 0.7. Preferably, the hydrocarbon dew point is 1000 psig is between 20° and 50° F.

The following example is given to illustrate the present invention.

(a) introducing into a first pyrolysis zone a particulate carbonaceous feed material, a first gas which is substantially free of free oxygen, and a first solid heating media;

(b) rapidly conducting said first gas, said first solid heating media, and said particulate carbonaceous feed material through said first pyrolysis zone in turbulent entrained flow for the rapid transfer of heat from said first solid heating media to said particulate carbonaceous feed material to at least partially gasify said particulate carbonaceous feed material and produce a first gaseous product comprising lower hydrocarbon gases having from one to four carbon atoms and a first char product, to thereby produce a first mixture of first solids comprising said first solid heating media and said first char product, and first fluids comprising said first gas and said first gaseous product;

(c) separating by the use of a first cyclone at least a part of said first solids from said first mixture;

(d) introducing into a second pyrolysis zone, a second gas substantially free of free oxygen, said separated first solids, and a second solid heating media;

(e) rapidly conducting said second gas, said separated first solids, and said second solid heating media through said second pyrolysis zone in turbulent entrained flow for the rapid transfer of heat from said second solid heating media to said separated first solids to at least partially gasify said separated first solids and produce a second gaseous product comprising hydrogen and carbon monoxide and a second char product, to thereby produce a second mixture of second solids comprising said first solid heating media, said second char product, and said second solid heating media, and second fluids comprising said second gas and said second gaseous product, said second gaseous product being produced at least in part directly from the devolatilization of the remaining volatilizable matter in said first char product in said separated first solids, while maintaining said second pyrolysis zone free of free oxygen by preventing free oxygen from being introduced into said second pyrolysis zone;

(f) removing essentially all gases and solids from said second pyrolysis zone in a single entrained stream, and separating by the use of a second cyclone at least a part of said second solids from said second mixture;

(g) heating said separated second solids by combustion with a gas comprising free oxygen to a first heating temperature high enough to impart to same sufficient thermal energy to form a heated solid heating media and a combustion gas;

(h) separating by the use of a third cyclone at least a part of said heated solid heating media from said combustion gas; and (i) recycling at least a part of said separated heated solid heating media to at least one of said pyrolysis zones as said first or second solid heating media.

2. The process of claim 1, further comprising recycling at least a part of said separated second solids to said first pyrolysis zone as said first solid heating media, and wherein the temperature of said first gaseous product is less than the temperature of said second solids.

3. The process of claim 1, wherein said first gaseous product has a first temperature which is sufficiently high that unless said first gaseous product is rapidly cooled, thermal decomposition of said lower hydrocarbon gases will exceed a minimal amount; and further comprising cooling said first gaseous product from said first temperature to a first lower temperature within a period of time sufficiently short that thermal decomposition of said lower hydrocarbon gases within such period of time is minimal, said first lower temperature being above the condensation temperature of said first gaseous product.

4. The process of claim 3, wherein the residence time of said first gas in said first pyrolysis zone is sufficiently short so that thermal decomposition of said lower hydrocarbon gases is minimal within said first pyrolysis zone.

5. The process of claim 4, further comprising cooling said first or second gaseous product to a second lower temperature lower than said first lower temperature to form a liquid product and a gaseous product remainder therefrom, and recovering said liquid product.

6. The process of claim 5, further comprising recycling a part of said gaseous product remainder to one of said pyrolysis zones.

7. The process of claim 6, wherein the temperature of said second gaseous product from said second pyrolysis zone is higher than said first temperature.

8. The process of claim 7, wherein said second char product is at a second temperature which is higher than said first temperature, and said first heating temperature is higher than said second temperature.

9. The process of claim 8, wherein said first temperature is less than the ash softening temperature of said particulate carbonaceous feed material.

10. The process of claim 9, wherein said second temperature is less than said ash softening temperature of said particulate carbonaceous feed material.

11. The process of claim 10, wherein said first heating temperature is less than said ash softening temperature of said particulate carbonaceous feed material.

12. The process of claim 11, wherein said residence time of said first gas in said first pyrolysis zone is less than about ten seconds.

13. A process for the gasification of particulate carbonaceous material comprising:

(a) introducing into a first pyrolysis zone a particulate carbonaceous feed material, a first gas which is substantially free of free oxygen, and a first solid heating media to provide heat for the gasification of said particulate carbonaceous feed material;

(b) rapidly conducting said first gas, said first solid heating media, and said particulate carbonaceous feed material through said first pyrolysis zone in turbulent entrained flow for the rapid transfer of heat from said first solid heating media to said particulate carbonaceous feed material to at least partially gasify said particulate carbonaceous feed material and produce a first gaseous product comprising lower hydrocarbon gases having one to four carbon atoms and a first char product, to thereby produce a first mixture of first solids comprising said first solid heating media and said first char product, and first fluids comprising said first gas and said first gaseous product, the residence time of said first gas in said first pyrolysis zone being sufficiently short that thermal decomposition of said lower hydrocarbon gases is minimal within said pyrolysis zone, said first gaseous product having a first temperature lower than the ash softening temperature of said particulate carbonaceous feed material, said first temperature also being sufficiently high that unless said first gaseous product is rapidly cooled thermal decomposition of said lower hydrocarbon gases will exceed a minimal amount;

(c) cooling said first gaseous product from said first temperature to a first lower temperature within a period of time sufficiently short that thermal decomposition of said lower hydrocarbon gases within such period of time is minimal, said first lower temperature being above the condensation temperature of said first gaseous product;

(d) separating by use of a first cyclone at least a part of said first solids, from said first mixture;

(e) introducing into a second pyrolysis zone maintained in turbulent entrained flow a second gas substantially free of free oxygen, said separated first solids and a second solid heating media to provide heat to at least partially devolatilize said first char product in said separated first solids and produce a second gaseous product comprising hydrogen and carbon monoxide and a second char product, to thereby produce a second mixture of second solids comprising said first solid heating media, said second char product, and said second solid heating media, and second fluids comprising said second gas and said second gaseous product, said second char product being raised to a second temperature higher than said first temperature but lower than said ash softening temperature of said particulate carbonaceous feed material, said second gaseous product being produced at least in part directly from the devolatilization of remaining volatilizable matter in said first char product in said separated first solids, while maintaining said second pyrolysis zone free of free oxygen by preventing free oxygen from being introduced into said second pyrolysis zone;

(f) removing essentially all gases and solids from said second pyrolysis zone in a single entrained stream, and separating by the use of a second cyclone at least a part of said second solids from said second mixture;

(g) heating said separated second solids by combustion with a gas comprising free oxygen to a first heating temperature high enough to impart to same sufficient thermal energy for use as a solid heating media, said first heating temperature being higher than said second temperature but lower than said ash softening temperature of said particulate carbonaceous feed material, thereby forming a heated solid heating media and a combustion gas;

(h) separating by the use of a third cyclone at least a part of said heated solid heating media from said combustion gas;

(i) recycling at least a part of said separated heated solid heating media to at least one of said pyrolysis zones as said first or second solid heating media;

(j) cooling at least one of said gaseous products to a second lower temperature which is lower than said first lower temperature, and sufficiently low to form a liquid product therefrom; and (k) recycling at least a part of at least one of said gaseous products to at least one of said pyrolysis zones.

14. The process of claim 13 wherein the residence time of said first gas in said first pyrolysis zone is less than about ten seconds, and said first lower temperature is between about 1000° and 1400° F.

15. The process of claim 14, further comprising recycling at least a part of said liquid product to one of said pyrolysis zones.

16. The process of claim 15, wherein part of said heated solid heating media is recycled to said first pyrolysis zone as said first solid heating media, and part of said heated solid heating media is recycled to said second pyrolysis zone as said second solid heating media.

17. The process of claim 16, further comprising introducing steam into at least one of said pyrolysis zones.

18. The process of claim 17, wherein said cooling of said first gaseous product to said first lower temperature precedes separating said first solids from said first mixture.

19. The process of claim 17, wherein cooling of said first gaseous product to said first lower temperature follows separating said first solids from said first mixture.

20. The process of claim 17, wherein said first temperature is at least about 1300° F. but no greater than about 1750° F., said residence time is between about 0.1 second and about 3 seconds, and said second temperature is between about 1400° and about 1800° F.

21. The process of claim 20 further comprising methanating said gaseous products to produce a gaseous product of higher methane content.

22. The process of claim 21 wherein said particulate carbonaceous feed material is coal.

23. The process of claim 22 further comprising reacting a part of said solid heating media with $H_2O$ to produce hydrogen and carbon monoxide.

24. The process of claim 23, further comprising fractionating a part of said liquid product to produce a thermally stable product comprising benzene, and a thermally unstable product, and recycling said thermally unstable product to one of said pyrolysis zones.

25. A process for the gasification of particulate carbonaceous material comprising:

(a) introducing into a first pyrolysis zone a particulate carbonaceous feed material, a gas which is substantially free of free oxygen, and a solid heating media to provide heat for the gasification of said particulate carbonaceous feed material;

(b) conducting said gas, said solid heating media, and said particulate carbonaceous feed material through said first pyrolysis zone in turbulent entrained flow for the rapid transfer of heat from said solid heating media to said particulate carbonaceous feed material to at least partially gasify a part of said particulate carbonaceous feed material to produce a first gaseous product comprising lower hydrocarbon gases having one to four carbon atoms, and a first char product, to thereby produce a first mixture of first solids comprising said solid heating media and said first char product, and first fluids comprising said gas and said first gaseous product, the residence time of said gas in said first pyrolysis zone being sufficiently short that thermal decomposition of said lower hydrocarbon gases is minimal within said first pyrolysis zone, said first gaseous product having a first temperature between about 1250° and about 1650° F.;

(c) cooling said first gaseous product from said first temperature to a first lower temperature of about 1000° F. within a period of time sufficiently short that thermal decomposition of said lower hydrocarbon gases within such period of time is minimal;

(d) separating by use of a first cyclone at least a part of said first solids from said first mixture;

(e) recovering at least part of said first fluid;

(f) introducing into a second pyrolysis zone, maintained substantially free of free oxygen by preventing free oxygen from being introduced into said second pyrolysis zone and while said second pyrolysis zone is maintained in turbulent entrained flow, at least a part of said separated first solids and additional solid heating media to provide heat for devolatilization of said first char product in said separated first solids, and devolatilizing said first char product in said separated first solids to produce a second char product and a second gaseous product comprising hydrogen and carbon monoxide, said second gaseous product being produced at least in part directly from the devolatilization of remaining volatilizable matter in said first char product in said separated first solids, said second char product being raised during said devolatilizing thereof to a second temperature between about 1400° and about 1800° F.;

(g) removing essentially all gases and solids from said second pyrolysis zone in a single entrained stream, and substantially separating by the use of a second cyclone second solids comprising said second char product and said solid heating media, from said second gaseous product;

(h) recovering at least a part of said second gaseous product;

(i) heating at least a part of said separated second solids to a first heating temperature high enough to impart to same sufficient thermal energy for use as said solid heating media, said first heating temperature being higher than said second temperature;

(j) recycling at least a part of said heated second solids to said pyrolysis zones as said solid heating media;

(k) cooling one of said gaseous products to a second lower temperature sufficiently low to form a liquid product therefrom;

(l) recovering at least a part of said liquid product; and (m) recycling at least a part of said first or second gaseous product at least to one of said pyrolysis zones.

26. The process of claim 25 wherein the residence time of said gas in said first pyrolysis zone is between about 0.01 second and about 3 seconds.

27. The process of claim 26 wherein said particulate carbonaceous feed material is coal.

28. The process of claim 27, further comprising recycling a part of said liquid product to at least one of said pyrolysis zones, and wherein said heating of said second solids to said first heating temperature is by combustion of a portion of said second solids.

29. The process of claim 28 further comprising introducing steam into at least one of said pyrolysis zones.

30. The process of claim 29 further comprising methanating said gaseous products to produce a gaseous product of higher methane content.

31. The process of claim 30, further comprising fractionating a part of said liquid product to produce a thermally stable product comprising benzene, and a thermally unstable product, and recycling said thermally unstable product to one of said pyrolysis zones.

32. The process of claim 22, wherein said first gaseous product comprises hydrogen in at least stoichiometric amount sufficient to convert essentially all of said lower hydrocarbon gases having one to four carbon atoms to methane, and further comprising treating said lower hydrocarbon gases with said hydrogen of said first gaseous product such that substantially all of said lower hydrocarbon gases are converted to methane.

* * * * *